United States Patent
Tong et al.

(10) Patent No.: US 8,812,323 B2
(45) Date of Patent: Aug. 19, 2014

(54) DIALOGUE SYSTEM AND A METHOD FOR EXECUTING A FULLY MIXED INITIATIVE DIALOGUE (FMID) INTERACTION BETWEEN A HUMAN AND A MACHINE

(75) Inventors: Rong Tong, Singapore (SG); Shuanhu Bai, Singapore (SG); Haizhou Li, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 1164 days.

(21) Appl. No.: 12/682,629

(22) PCT Filed: Oct. 9, 2008

(86) PCT No.: PCT/SG2008/000394
§ 371 (c)(1),
(2), (4) Date: Aug. 16, 2010

(87) PCT Pub. No.: WO2009/048434
PCT Pub. Date: Apr. 16, 2009

(65) Prior Publication Data
US 2010/0299136 A1 Nov. 25, 2010

Related U.S. Application Data

(60) Provisional application No. 60/979,236, filed on Oct. 11, 2007.

(51) Int. Cl.
*G10L 15/00* (2013.01)
*G10L 15/18* (2013.01)

(52) U.S. Cl.
USPC ............ 704/257; 704/231; 704/251; 704/275

(58) Field of Classification Search
USPC ...................... 704/9, 231, 257, 275
See application file for complete search history.

(56) References Cited

U.S. PATENT DOCUMENTS

| 6,983,252 | B2 * | 1/2006 | Matheson et al. | 704/275 |
| 7,181,386 | B2 * | 2/2007 | Mohri et al. | 704/1 |
| 7,184,957 | B2 * | 2/2007 | Brookes et al. | 704/246 |
| 7,194,069 | B1 * | 3/2007 | Jones et al. | 379/88.02 |
| 7,206,742 | B2 * | 4/2007 | Schmid et al. | 704/257 |
| 7,243,071 | B1 * | 7/2007 | Resnick et al. | 704/257 |

(Continued)

OTHER PUBLICATIONS

Polifroni, J., et al., "Towards the Automatic Generation of Mixed-Initiative Dialogue Systems from Web Content," Euro speech 03, MIT Laboratory for Computer Science, Corp. of Nat. Research Initiatives.

(Continued)

*Primary Examiner* — David Hudspeth
*Assistant Examiner* — Shaun Roberts
(74) *Attorney, Agent, or Firm* — Volpe and Koenig, P.C.

(57) ABSTRACT

A method for executing a fully mixed initiative dialogue (FMID) interaction between a human and a machine, a dialogue system for a FMID interaction between a human and a machine and a computer readable data storage medium having stored thereon computer code for instructing a computer processor to execute a method for executing a FMID interaction between a human and a machine are provided. The method includes retrieving a predefined grammar setting out parameters for the interaction; receiving a voice input; analyzing the grammar to dynamically derive one or more semantic combinations based on the parameters; obtaining semantic content by performing voice recognition on the voice input; and assigning the semantic content as fulfilling the one or more semantic combinations.

19 Claims, 8 Drawing Sheets

(56) References Cited

U.S. PATENT DOCUMENTS

| | | | |
|---|---|---|---|
| 7,254,545 B2 * | 8/2007 | Falcon et al. | 704/275 |
| 7,747,438 B2 * | 6/2010 | Nguyen et al. | 704/257 |
| 7,941,312 B2 * | 5/2011 | Jindal et al. | 704/9 |
| 8,229,745 B2 * | 7/2012 | Ativanichayaphong et al. | 704/257 |
| 8,417,511 B2 * | 4/2013 | Silva et al. | 704/9 |
| 2003/0061029 A1 | 3/2003 | Shaket | |
| 2004/0085162 A1 | 5/2004 | Agarwal et al. | |
| 2005/0278180 A1 | 12/2005 | O'Neill et al. | |
| 2006/0069547 A1 | 3/2006 | Wang et al. | |

OTHER PUBLICATIONS

Herzog, G., et al., "Large-scale software integration for spoken language and multimodal dialog systems," Nat. Language Eng. 10 (3/4): 283-205. c 2004 Cambridge Univ. Press, German Research Center for Artificial Intelligence.

Int'l Search Rpt. for PCT/SG2008/000394, dated Dec. 22, 2008.

* cited by examiner

TICKETING[

( ?(i'd like to)  ACTION:a  ?(from CITY:fc to CITY:tc)  ?(?on DATE:d)  ?(?[of with] AIRLINE:l) )

( ?(i'd like to)  ACTION:a  ?(from CITY:fc to CITY:tc)  ?(?[of with] AIRLINE:l)  ?(?on DATE:d) )

( ?(i'd like to)  ACTION:a  ?(?[of with] AIRLINE:l)  ?(from CITY:fc to CITY:tc)  ?(?on DATE:d) )

] {return([<action $a> <from_city $fc> <to_city $tc> <date $d> <airline $l>])}

ACTION[
(check ?flight ?schedule ?information) {return(query)}
    [(book [(a ticket) ticket] ?(for a ?return trip)) travel] {return(book)}

TICKETING[

( ?(?(i'd like to) ACTION) ?(from CITY:fc to CITY:tc) ?(?on DATE:d) (?[of with] AIRLINE:l) )

(?(?(i'd like to) ACTION) ?(from CITY:fc to CITY:tc) (?[of with] AIRLINE:l) ?(?on DATE:d) )

(?(?(i'd like to) ACTION) (?[of with] AIRLINE:l) ?(from CITY:fc to CITY:tc) ?(?on DATE:d) )

( ?(?(i'd like to) ACTION) ?(from CITY:fc to CITY:tc) (on DATE:d) ?(?[of with] AIRLINE:l) )

(?(?(i'd like to) ACTION) ?(from CITY:fc to CITY:tc) ?(?[of with] AIRLINE:l) (?on DATE:d) )

(?(?(i'd like to) ACTION) ?(?[of with] AIRLINE:l) ?(from CITY:fc to CITY:tc) (?on DATE:d) )

( ?(?(i'd like to) ACTION) (from CITY:fc to CITY:tc) ?(on DATE:d) ?(?[of with] AIRLINE:l) )

(?(?(i'd like to) ACTION) (from CITY:fc to CITY:tc) ?([of with] AIRLINE:l) ?(?on DATE:d) )

(?(?(i'd like to) ACTION) ?(?[of with] AIRLINE:l) (from CITY:fc to CITY:tc) ?(?on DATE:d) )

] {return([<from_city $fc> <to_city $tc> <date $d> <airline $l>])}  ◄——— 402

ACTION[

[(book [(a ticket) ticket] ?(for a ?return trip)) travel] {return(book)}  ◄——— 404

DIALOGUE SYSTEM AND A METHOD FOR EXECUTING A FULLY MIXED INITIATIVE DIALOGUE (FMID) INTERACTION BETWEEN A HUMAN AND A MACHINE

FIELD OF INVENTION

The present invention relates broadly to a dialogue system for a fully mixed initiative dialogue (FMID) interaction between a human and a machine, to a method for executing a fully mixed initiative dialogue (FMID) interaction between a human and a machine and to a computer readable data storage medium having stored thereon computer code means for instructing a computer processor to execute a method for executing a fully mixed initiative dialogue (FMID) interaction between a human and a machine.

BACKGROUND

Speech enabled user interfaces are typically used on computing devices ranging from hand held devices to servers handling sophisticated queries and transactions. With technology progress in speech recognition and improvement in user interface designs, speech enabled applications are being used in human computer interaction. Speech based interface has thus expanded the range of use of computer systems.

One application of speech based user interfaces is speech enabled call center and customer care solutions. A user can call a particular number provided by a service provider to find information such as flight schedules, landmark locations and traffic conditions. By building the terms and possible user queries of service domains into a speech recognition system, the system can then recognize these terms and sentences regarding services of the domains. Based on recognition results, the system provides users with the relevant information asked for, or performs transactions requested. In order for users to cooperate with the system to fulfil particular tasks efficiently and smoothly, the system typically provides appropriate prompt information or guides and leads the user to follow some steps as a dialogue process between the user and the system proceeds. The process of exchanging information between humans and machines through human language is called dialogue and the process of designing software that is able to carry out human-machine dialogue is called dialogue design.

Typically, directed dialogue is used in which conversations are conducted in a rigid, computer-oriented manner. Users follow computer prompts step by step to input required items in a pre-programmed order. In contrast to directed dialogue, Mixed Initiative Dialogue (MID) has been proposed. In a MID process, a user has the flexibility to choose e.g. the order and/or the amount of information the user wants to convey, according to the user's language use preferences and experience of the interface. It will be appreciated that MID provides a more natural way of language communication between humans and machine, and therefore, MID is increasingly used in speech enabled user interfaces.

Apart from typical characteristics such as a high recognition rate and robust performance of a speech recognition engine, dialogue design is also a consideration for speech based applications. There are a number of factors that are taken into account when designing a speech enabled user interface. Typically, to build a speech enabled interface for an application, domain content and operational information are compiled in the forms of grammar that describe the sublanguage used by humans to operate the computer system. The purpose of the grammar is to narrow down the scope of the recognition tasks so that the recognition engine can achieve a higher recognition rate. Separately, a piece of dialogue software is typically designed for instructing the recognition engine to perform a speech recognition process using the grammars when receiving user utterances. It will be appreciated that dialogue design should be able to handle not only dialogue logic, but also abnormal user behaviours such as bad speech, out of domain queries, timeout actions etc. Typically, to look for a design that can meet user requirements, different user interface prototypes are implemented for usability tests across a plurality of users. This is typically time consuming. Therefore, it will be appreciated that dialogue design is not a trivial task and design environments and tools, especially for rapid development and test, are needed to alleviate the efforts to carry out such activities.

It has been appreciated that developing complicated dialogue systems is relatively difficult. A developer typically needs to consider a plurality of details of the dialogue process. Further, the developer typically needs to consider possible different inputs from users and then plan in advance, e.g. via hard-coding, the actions to be taken with the various different inputs.

Moreover, application domains and contents provided by services are typically changing frequently. These changes give rise to changes in grammars and dialogue logic. Thus, maintenance work for speech enabled applications is another consideration. Automatic or semi-automatic processes can be significantly useful for the maintenance work.

In 'Towards the Automatic Generation of Mixed-Initiative Dialogue Systems from Web Content' published by Joseph et al in Euro speech 03, MIT Laboratory for Computer Science, Corporation for National Research Initiatives, a number of approaches are introduced to create a dialogue system and provide a dialogue management and response planning strategy that is adaptable to on-line content, thereby improving interaction with a user. However, the parsed data is organized into subcategories based on numeric values and the paper does not describe any analysing of the use of grammars produced by a speaker during a speech.

In 'Large-scale software integration for spoken language and multimodal dialog systems', published by Gerd et al in Natural Language Engineering 10 (3/4): 283-305. c 2004 Cambridge University Press, German Research Center for Artificial Intelligence, a framework for large-scale software integration that results from the realization of various natural language and multimodal dialog systems is introduced. The approach relies on a distributed component model that enables flexible re-use and extension of existing software modules. However, the paper does not analyze the use of grammars produced by a speaker during a speech.

US publication no. 2006/0069547 ∝describes a method which focuses on creating grammar for alphanumeric concepts from inputs like regular expression. The grammar is parsed and generated by rules together with prefix optimization. The field of grammars is therefore significantly narrow. In particular, this document is only focusing on generating grammars from alpha-numeric concepts, which is a specific form of expression used in language. It will be appreciated that this form of generation can at best be only regarded as a process of converting alpha-numeric expressions into grammars. Furthermore, this document does not provide any teaching on dialogue generation based on generated grammars.

US publication no. 2006/0085192 describes a system for conducting a user dialog via a speech based user interface. The system includes an auditory prompt module for generating a sequence of goal-directed auditory prompts based upon pre-determined user-oriented tasks. However, the system does not analyse the use of grammars produced by a user during a speech.

Hence, there exists a need for a dialogue system for a fully mixed initiative dialogue (FMID) interaction between a human and a machine and a method for executing a fully mixed initiative dialogue (FMID) interaction between a human and a machine that seek to address at least one of the above problems.

SUMMARY

In accordance with a first aspect of the present invention, there is provided a method for executing a fully mixed initiative dialogue (FMID) interaction between a human and a machine, the method comprising retrieving a predefined grammar setting out parameters for the interaction; receiving a voice input; analysing the grammar to dynamically derive one or more semantic combinations based on the parameters; obtaining semantic content by performing voice recognition on the voice input; and assigning the semantic content as fulfilling the one or more semantic combinations.

The method may further comprise deciding on whether there are any unfulfilled semantic combinations; and if there are any unfulfilled semantic combinations, dynamically generating a new grammar based on the unfulfilled semantic combinations and the originally retrieved grammar, and applying said new grammar for a new speech interaction.

Said dynamically generating may comprise removing grammar items from the originally retrieved grammar based on fulfilled semantic combinations, instantiating grammar items from the originally retrieved grammar based on fulfilled semantic combinations or both.

The method may further comprise generating a dialogue for the new speech interaction using the new grammar.

The method may further comprise constructing a Finite State Machine (FSM) architecture based on the semantic combinations for generating one or more new states if there are any unfulfilled semantic combinations and for showing state transitions once semantic combinations are fulfilled.

The method may further comprise forming a slot filling table using the derived one or more semantic combinations.

Said analysing the grammar may comprise converting the grammar into a logical expression.

The one or more semantic combinations may be usable for carrying out a task.

In accordance with a second aspect of the present invention, there is provided a dialogue system for a fully mixed initiative dialogue (FMID) interaction between a human and a machine, the system comprising a grammar parser module for retrieving a grammar setting out parameters for the interaction, the grammar parser module analysing the grammar to dynamically derive one or more semantic slot combinations based on the parameters; a browser module for receiving a voice input; a recognition server for obtaining semantic content by performing voice recognition on the voice input; and wherein the grammar parser module assigns the semantic content as fulfilling the one or more semantic combinations.

The system may further comprise the grammar parser module for deciding whether there are any unfulfilled semantic slot combinations; and a grammar generation module; wherein if there are any unfulfilled semantic combinations, the grammar generation module dynamically generates a new grammar based on the unfulfilled semantic combinations and the originally retrieved grammar and applies said new grammar for a new speech interaction.

Said dynamically generating may comprise the grammar generation module removing grammar items from the originally retrieved grammar based on fulfilled semantic combinations, the grammar generation module instantiating grammar items from the originally retrieved grammar based on fulfilled semantic combinations or both.

The system may further comprise a dialogue generation module for generating a dialogue for the new speech interaction using the new grammar.

The system may further comprise a Finite State Machine (FSM) constructor for constructing a FSM architecture based on the semantic combinations for generating one or more new states if there are any unfulfilled semantic combinations and for showing state transitions once semantic combinations are fulfilled.

The system may further comprise the grammar parser module forming a slot filling table using the derived one or more semantic combinations.

Said analysing the grammar may comprise the grammar parser module converting the grammar into a logical expression.

The one or more semantic combinations may be usable for carrying out a task.

In accordance with a third aspect of the present invention, there is provided a computer readable data storage medium having stored thereon computer code means for instructing a computer processor to execute a method for executing a fully mixed initiative dialogue (FMID) interaction between a human and a machine, the method comprising retrieving a predefined grammar setting out parameters for the interaction; receiving a voice input; analysing the grammar to dynamically derive one or more semantic combinations based on the parameters; obtaining semantic content by performing voice recognition on the voice input; and assigning the semantic content as fulfilling the one or more semantic combinations.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 3 is an example of a predefined grammar used for an air ticket booking system in the example embodiment.

FIG. 4 is an example of a generated new grammar 400 in the example embodiment.

DETAILED DESCRIPTION

Figure 1:
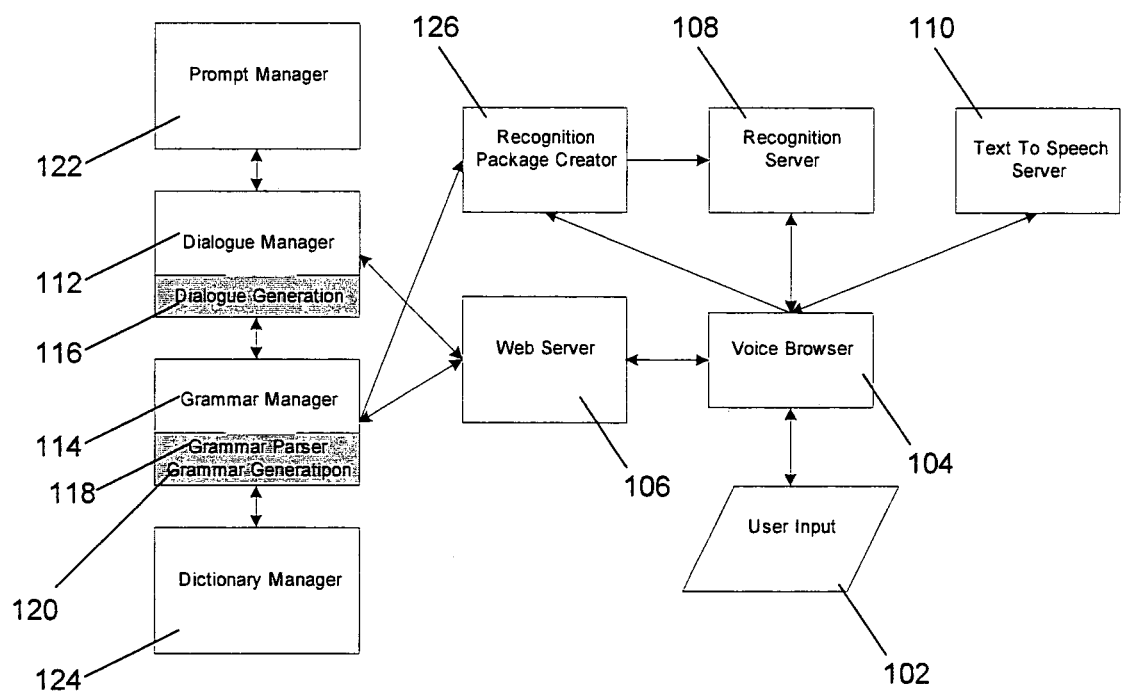
FIG. 1 is a schematic block diagram illustrating an architecture of a dialogue system in an example embodiment.

Example embodiments described herein can provide a system and a method for automatic sub-grammar and dialogue generation. The example embodiments can be used for MID systems.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

The invention may also be implemented as hardware modules. More particular, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

FIG. 1 is a schematic block diagram illustrating an architecture of a dialogue system in an example embodiment. A user interacts with the dialogue system (see numeral 102) through a Voice Browser module 104 that in turn calls a Web Server module 106 to obtain voice interface pages for interpretation. The interpretation by the Voice Browser module 104 may comprise calling of a Recognition Server module 108 for recognition tasks and a Text to Speech Server module 110 for prompt generations.

The Web Server module 106 can dynamically generate dialogue (e.g. using VXML scripts and Grammars) by calling a Dialogue Manager module 112 and a Grammar Manager module 114. In the example embodiment, the Dialogue Manager module 112 comprises a Dialogue Generation module 116. The Grammar Manager module 114 comprises a grammar parser module 118 and a grammar generation module 120. The Dialogue Manager module 112 calls a Prompt Manager module 122 to create prompts for newly generated scripts. The Grammar Manager module 114 calls a Dictionary Manager module 124 to provide pronunciations for certain words. Further, the Voice Browser module 104 can call a Recognition Package Creator module 126 for newly generated grammars and build new recognition packages that are sent to the Recognition Server module 108.

Figure 2:
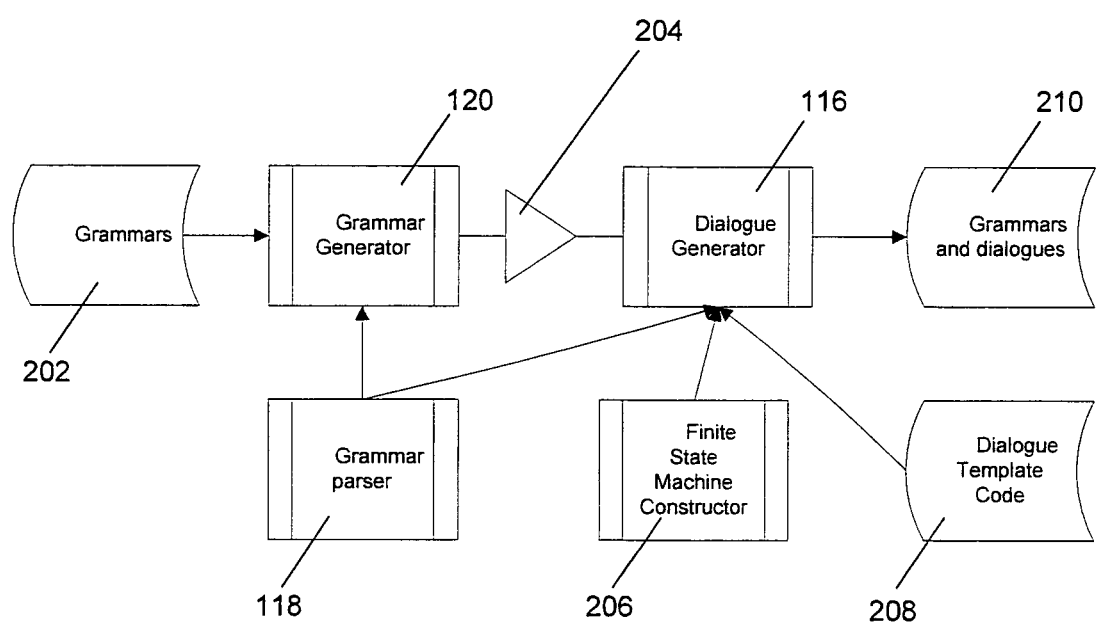
FIG. 2 is a schematic block diagram for illustrating dynamic grammar and dialogue generation in the example embodiment.

FIG. 2 is a schematic block diagram for illustrating dynamic grammar and dialogue generation in the example embodiment. In the example embodiment, the grammar generation module or grammar generator 120 calls the grammar parser module 118 and receives existing grammars 202 to generate grammars (see numeral 204) to be used by the dialogue generation module dialogue generator 116. The Dialogue Generator 116 calls the grammar parser module 118 to generate slot filling combination tables and calls a Finite State Machine (FSM) constructor 206 to build states and transition arcs. Further, the FSM constructor 206 receives grammar generator outputs 204 and predefined dialogue template codes 208 to generate dialogue code and grammars at numeral 210.

In a spoken language dialogue system, grammars provide a constraint of language use at a particular dialogue point. If a user speaks something beyond the scope a grammar specifies, the system cannot understand what the user has spoken about. Grammar use also provides flexibility of a user interface for different users. Users may speak in different ways with different vocabulary and different orders to convey a same meaning. Besides the constraints, grammars are designed to deal with situations such as variations and flexibilities.

Thus, grammars can define the vocabulary for recognition points during speech interaction. Grammars can also define a language model for recognition points during speech interaction. Grammars can assist a dialogue system to achieve high recognition rates for practical usage. Further, at different recognition points, different grammars may be used.

FIG. 3 is an example of a predefined grammar 300 used for an air ticket booking system in the example embodiment.

Grammars are defined recursively. In the grammar 300, words with capital letters (such as ACTION) are sub-grammars which mean that these words are also grammars describing structures in the language. For example, refer to numeral 302 for the definition of sub-grammar ACTION. The sub-grammars are defined in the system and can be explicitly called by other grammars. Symbols following the column after the sub-grammars are variables assigned with the return values of the sub-grammars. For example, see "return (query)". In the grammar, items within round brackets e.g. "( . . . )" are concatenations, representing "concatenation and" relations. This means that the items are concatenated to form sentences. Items within square brackets e.g. "[ . . . ]" are alternatives, representing "selective or" relations. This means only one of the items in the square brackets are used. Items following a question mark are optional items. For example, "?(I'd like to)". The symbol pairs in the angle brackets e.g. "<action $a>" are semantic slot names and values. The value at the right hand place e.g. $a is assigned to the variable at the left e.g. action. If the grammar items responsible for assigning a value to a particular slot variable do not appear in an instance such as in a received spoken sentence, the variable is assigned an empty value.

In the example embodiment, the grammar parser module 118 (FIG. 2) is designed for automatic dialogue generation. By going through the grammars and sub-grammars recursively, the grammar parser module 118 (FIG. 2) analyzes grammar item relations and finds out the corresponding semantic slot filling combinations, to generate a slot filling table. The grammar parser module 118 (FIG. 2) first converts grammars (such as 300 in FIG. 3) into logical expressions with variables as slot names and then derives the slot filling table from the logical expressions.

Suppose grammar G has top level items G1, G2, . . . , Gn. Each item can be a sub-grammar or a terminal. A terminal in grammar is defined as an item that cannot be further expanded or instantiated. A grammar parsing algorithm can be recursively described as follows:

1. Set slot filling logical expression L empty.
2. If Gi(s) are in Concatenation And relations (in the example grammar 300 in FIG. 3, Gi(s) are in round brackets), let $L=(G1\hat{\ }G2\hat{\ } \ldots \hat{\ }Gn)$.
3. If Gi(s) are in Selective Or relations (in the example grammar 300 in FIG. 3, Gi(s) are in square brackets), let $L=(G1+G2+ \ldots +Gn)$.
4. If Gi is an optional item, then replace Gi in L with (I+Gi), where I is an empty variable.
5. If Gi assigns a slot name s, replace Gi in L with (s^Gi).
6. If Gi is a sub-grammar, recursively call this algorithm. If Gi is a terminal, replace Gi in L with I.
7. Simplify L by applying the following rules $x\hat{\ }(y+z)=x\hat{\ }y+x\hat{\ }z$, $x+x=x$, $x\hat{\ }x=x$, $x\hat{\ }1=x$, $x+y=y+x$, $x\hat{\ }y=y\hat{\ }x$.

For example, grammar 300 from FIG. 3 is analysed and converted in logical expressions:

$$E=\text{action}+((\text{action}\hat{\ }(I+(\text{from\_city}\hat{\ }\text{to\_city}))\hat{\ }(I+\text{date})\hat{\ }$$
$$(I+\text{airline})) \Rightarrow (\text{action}\hat{\ }\text{airline}\hat{\ }\text{date}\hat{\ }\text{from\_city}\hat{\ }$$
$$\text{to\_city})+(\text{action}\hat{\ }\text{date}\hat{\ }\text{from\_city}\hat{\ }\text{to\_city})+(\text{ac-}$$
$$\text{tion}\hat{\ }\text{airline}\hat{\ }\text{from\_city}\hat{\ }\text{to\_city})+$$
$$(\text{action}\hat{\ }\text{from\_city}\hat{\ }\text{to\_city})+(\text{action}\hat{\ }\text{airline}\hat{\ }\text{date})+$$
$$(\text{action}\hat{\ }\text{date})+(\text{action}\hat{\ }\text{airline})+(\text{action})$$

Thus, eight semantic slot filling combinations can be generated for the slot filling table by converting/analysing the example grammar 300 in FIG. 3.

The equation above is only illustrative. The operators are similar to those in mathematical logic. Slot name x relating to optional grammar items are represented as l+x and l means an empty variable, following the rule that $l\hat{\ }x=x$. Table 1 below shows an exemplary slot filling table generated by the grammar parser module 118.

TABLE 1

| Number | Slot Names | Example of Instantiation Sentence |
|---|---|---|
| 1 | action, airline, date, from_city, to_city | Book a ticket for a trip from Singapore to Hong Kong with SIA on next Monday. |
| 2 | action, date, from_city, to_city | Book a ticket for a trip from Singapore to Hong Kong on next Monday. |
| 3 | action, airline, from_city, to_city | Book a ticket for a trip from Singapore to Hong Kong with SIA. |
| 4 | action, from_city, to_city | Book a ticket from a trip from Singapore to Hong Kong. |
| 5 | action, airline, date | Book a ticket on next Monday of SIA. |
| 6 | action, date | Book a ticket on next Monday. |
| 7 | action, airline | Book a ticket of SIA. |
| 8 | Action | Book a ticket. |

The various slot filling combinations from the above equation form directly the second column (i.e. "Slot Names") of Table 1. There are eight scenarios for the slots to be filled and each has an example instantiation sentence (see third column) that fills the slots with values. That means that a speech recognition engine has at least eight outcomes by applying this grammar when interacting with users at a particular point and each outcome contains a different amount of information carried in the slots. Based on the outcomes, the dialogue system in the example embodiment can make decisions on a next step to be taken in order to fulfil a task. If all the slots are filled, the dialogue system can move onto the next stage to do the required work, such as processing logic e.g. for placing booking orders, database access, etc. On the other hand, if the slots are only partially filled, the dialogue system figures out ways to enable the user to fill the remaining slots before moving to the next stage. For example, in the Number 1 scenario in Table 1, experienced users can talk to the dialogue system with longer sentences conveying all the information required to fulfil the booking task. In the Number 8 scenario in Table 1, new users may only speak in short sentences to convey information bit by bit. In such cases, a number of rounds of human-machine interaction are performed in order to fulfil the booking task.

Thus, the grammar parser module 118 (FIG. 2) can automatically extract semantic slot combinations of a grammar. The slot combinations are defined to mean the relations of semantic slots expressed in the grammar. Further, the grammar parser module 118 (FIG. 2) also locates slot filling orders of the grammar (e.g. in the top level grammar 300 of FIG. 3) conveyed either within a user utterance or fulfilled by different utterances.

Therefore, in a MID system of the example embodiment, a user has the flexibility to speak complicated utterances carrying all the information required at a particular interaction point such that the system can move onto a next stage to do the work, upon the completion of smooth recognition. If a user utterance is not complete and there are still slots to be filled, the system can conduct extra dialogue sessions with the user to collect the remaining information, or to fill the remaining slots with appropriate values.

In the example embodiment, preparing dialogue sessions comprise generating grammars for these sessions.

The grammar generation module 120 (FIG. 2) is provided to derive sub-grammars according to the progress of the dialogue between the user and the system. By analyzing the slot filling orders provided by the user, the grammar generation module 120 (FIG. 2) derives new grammars by either removing the grammar items dedicated to the filled slots or rephrasing the items to reflect the fulfillment of some slots and expectations of the unfulfilled slots. This can provide convenience for carrying out smooth dialogue to fulfil the empty/unfulfilled slots.

The grammar generation module 120 (FIG. 2) receives grammars and filled slot names and values. The grammar generation module 120 (FIG. 2) produces new grammars (see 204 in FIG. 2) for the recognition task to collect values of the remaining slots. There are two approaches to generate new grammars. One approach is to remove the grammar items responsible for collecting the values of slots already filled. For example, if the grammar item ACTION has been assigned a value of "book", the items ACTION are removed. Another approach is to instantiate the grammar items with the values of the slots wherever they are filled. For instantiating a grammar item, the item is maintained in the grammar (ie. not removed) and constantly returns the value that it has been assigned with. This approach for instantiating takes place dynamically during runtime because the values of the slots are only determined after the recognition results are produced. It will be appreciated that the grammar parser module 118 (FIG. 2) is used for correctly locating the grammar items.

Suppose grammar G has top level items G1, G2, ..., Gn. Each item can be a sub-grammar or a terminal. Among its slots, S1, ..., Sk are filled at a recognition point. The grammar generation algorithm can be described as follows:
1. For each Gi, do the following:
2. If Gi is a terminal and assigns a value to a slot Sj, then make Gi an optional item, remove the slot assigning action.
3. If Gi is a terminal and does not assign a value to a slot Sj, no action is taken. For example, since a terminal can be defined to have one definite value only, if a value is not assigned, no further action needs to be taken.
4. If Gi is a sub-grammar and assigns a value to a slot Sj, then make Gi an optional item. Remove the slot assigning action and instantiate Gi with the values the sub-grammar returns. To instantiate a grammar G with a value, all the optional grammar items which do not return the value are removed and only the items returning the value are kept.
5. If Gi is a sub-grammar and does not assign a value to a slot which is one of Sj, recursively call this process.

FIG. 4 is an example of a generated new grammar 400 in the example embodiment. The generated new grammar 400 is at the output of the grammar generation module 120 (FIG. 2). In this example, only the slot "action" is filled with a value "book". The generated grammar is based on the grammar 300 shown in FIG. 3.

The newly generated grammar 400 has four semantic slots only (see numeral 402). However, the size of the generated grammar 400 is bigger (as compared to the grammar 300 shown in FIG. 3) because some operations have been applied to remove empty paths that the generated grammar 400 may give rise to by rephrasing the formatting of the grammar items.

For example, in grammar 300 of FIG. 3, the first line of the grammar 300, ie. (?(i'd like to) ACTION:a ?(from CITY:fc to CITY:tc) ?(?on DATE:d) ?(?[of with] AIRLINE:l)), has three optional items that are meant to collect city, date and airline information. The optional items are represented by ?(from CITY:fc to CITY:tc), ?(?on DATE:d) and ?(?[of with] AIRLINE:l). These three pieces of information can be collected by "combinatorial" optional ways in the order specified by the grammar 300. That is, none or one or two or all three of the three optional pieces of information can be collected simultaneously. In grammar 300 of FIG. 3, the item ACTION is not optional and has to be instantiated. Therefore, even if a user does not mention the three optional items, the grammar does not contain empty paths (ie. a value for ACTION is still required). Empty paths result in the erroneous acceptance of empty utterances (ie. if the user does not say anything). Thus, grammar 300 of FIG. 3 is valid.

On the other hand, in the generated grammar 400, the item ACTION has already been instantiated. Thus, the sub-grammar of the generated grammar 400 is meant to collect remaining information (ie. city, date and airline information). In this case, one or two or all three pieces of the remaining information can be collected simultaneously. In other words, not all the three remaining items can be optional at the same time. Otherwise, empty grammar paths are introduced. For example, AIRLINE is not an optional item in the first line of the generated grammar 400.

Thus, in the example embodiment, an algorithm is introduced and run to detect empty paths and to rephrase the grammar items, during generation of new grammars.

As described, the generated new grammar 400 shown in FIG. 4 is one that comprises the approach for instantiating a grammar with an assigned value. The grammar items for ACTION are now optional and (at numeral 404) the sub-grammar ACTION returns the value "book" to instantiate the grammar items for ACTION.

In the example embodiment, a speech enabled dialogue system can be described as a FSM, in which a state can be regarded either as a recognition point or as a functional block performing domain dependent processing logic. A state in a FSM is associated with a grammar and a slot filling table. Each entry of the table contains at least two values, i.e. a slot combination and a transition link indicating where a corresponding state transfers to upon filling the slot(s) the entry indicates. Transitions are made based on outcomes of the recognition engine or processing logic. The automatic dialogue generation module 116 (FIG. 2) performs tasks such as creating states for recognition points and establishing transition links among states. The states dedicated to domain dependent processing logic and the transitions of states for such processing logic can be created manually.

Thus, in the example embodiment, a FSM constructor 206 (FIG. 2) is provided to carry out the above process. Dialogue processes are described as state transitions of the FSM in which states are associated inputting points and transitions are associated accomplishments of inputs and expected inputs. Each inputting point employs a grammar constraining acceptable language expressions and semantic content to be captured. The grammar can be predefined or dynamically generated during the dialogue process. No-input states may be inserted between transitions for the purpose of conducting domain specific data processing.

The inventors have recognised that dialogue generation can be performed statically or dynamically. Static dialogue generation is based on figuring out all possible dialogue scenarios and building dialogue FSMs in advance. Dynamic dialogue generation creates only the states the dialogue system is expected to transfer to. Therefore, the transition steps are automatically resolved. The dynamic approach of the example embodiment can be implemented with scripting development language, e.g. Voice Extensible Markup Language (VXML) with a web server architecture.

In the example embodiment, dialogue generation can work in a top-down approach. A designer can give a high level design focusing on processing logics and top level grammars (compare 300 of FIG. 3) and the dialogue system is able to fill up the details of the design. At the implementation level, coding templates can be implemented manually according to functionality and parameter types. The dialogue system finds a matching template e.g. from a database and fills in parameters as well as creates data links from the template to other data sources if applicable.

Thus, a dialogue generation module 116 (FIG. 2) is provided to take grammar parser results as inputs and build dialogue state transition sub-networks via calling the FSM constructor 206 (FIG. 2). The order of the slot filling process determines the states and target states of transition arcs of the constructed FSM.

Figure 5:
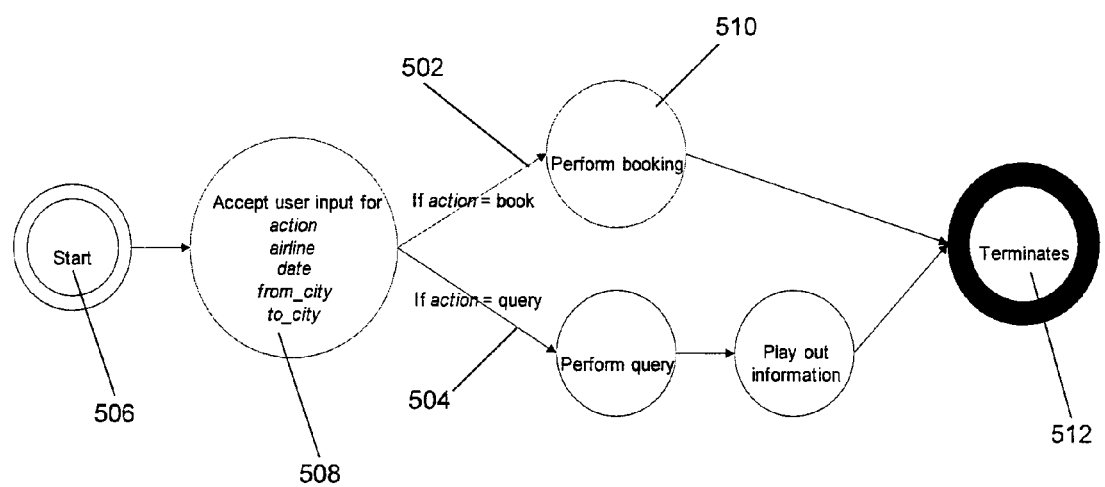
FIG. 5 is a schematic flow diagram illustrating an example call flow in an example embodiment.

FIG. 5 is a schematic flow diagram illustrating an example call flow in an example embodiment. The path 502 represents a booking service and the path 504 represents a query service. The path taken depends on the action value given by the user.

At 506, a user calls into a dialogue system (compare FIG. 1) for a service. The dialogue system performs user interaction at 508 to accept information such as action, airline, date, from_city, to_city. At numeral 508, grammars designed to handle MIDs are used to perform speech recognition. A grammar parser module (compare 118 of FIG. 2) is called to generate a slot filling table for registering all possible slot filling combinations. For each entry in the table, a new state is created for performing speech recognition to accept the values of remaining slots if the state for filling the combination of slots does not already exist. Further, transition links are established from the entries of the table to the states. For example, a table entry indicating that the slots are all filled leads to a transition to a final state which is the target state 510. For each newly created state (when there are unfilled slots), a grammar generation module (compare 120 of FIG. 2) is applied to generate grammars that target filling the remaining slots in a fully mixed initiative interaction. The process of e.g. slot filling, state transition and grammar generation is repeated until there are no new states. That is, in this example, a booking is performed at numeral 510 and the call flow terminates at numeral 512. Similarly, the process is carried out if the user chooses the action 'query' for path 504 instead of path 502.

Figure 6:
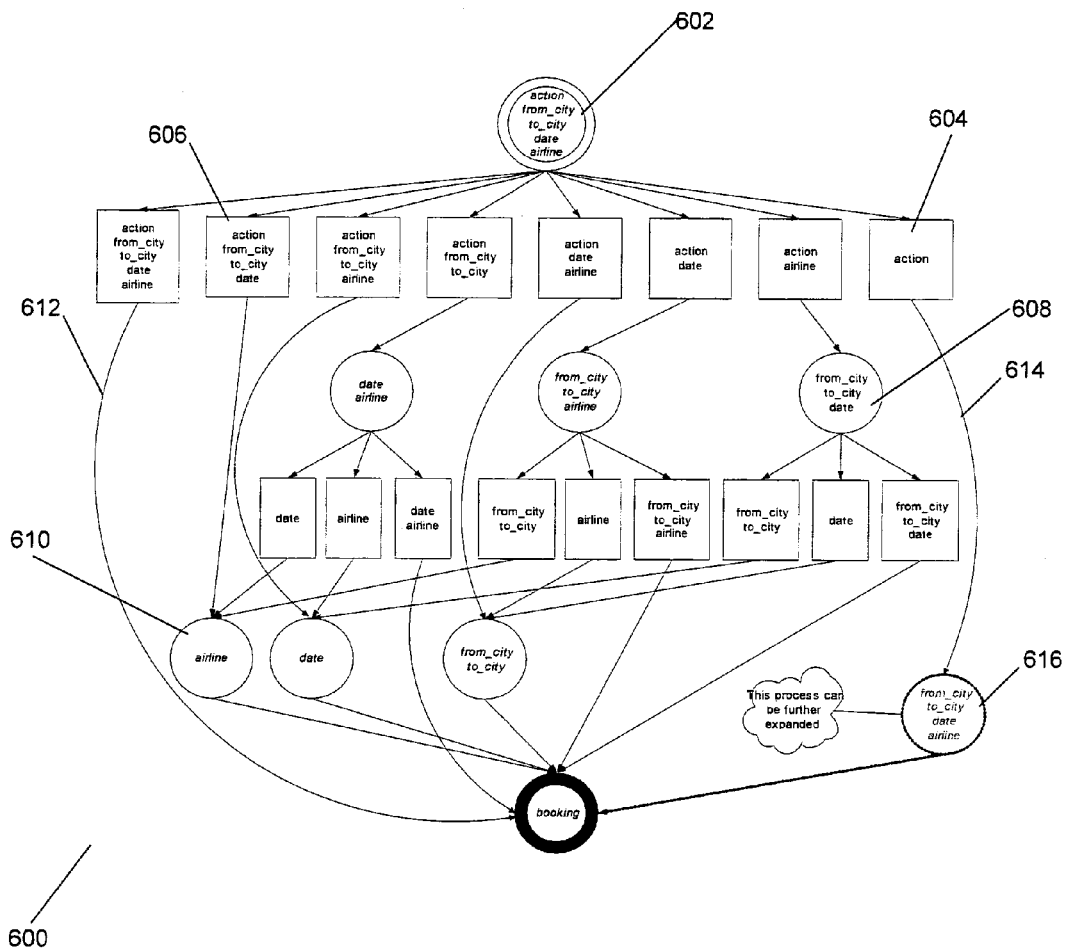
FIG. 6 is a schematic flowchart 600 illustrating how states and transition are dynamically generated based on a received grammar in an example embodiment.

FIG. 6 is a schematic flowchart 600 illustrating how states and transition are dynamically generated based on a received grammar in an example embodiment. The flowchart 600 illustrates a result generated from the block diagram example of FIG. 2.

Given a MID grammar G, the dialogue generation algorithm of a grammar generation module (compare 120 of FIG. 2) automatically builds a FSM incorporating the sub-dialogues and grammars for carrying out fully mixed initiative dialogue (FMID). The algorithm is as follows:
1. Create a FSM F with a single state S performing recognition using G and associate S with G.
2. Call a grammar parser module to generate a slot filling table for each Gi of Si.
3. For each entry E in the table
   (i) Check whether a state for accepting the slot combination of E is already created. If yes, establish a transition arc from E to the state and finish this entry.
   (ii) Otherwise, create a new state Sj and build a transition arc from E.
   (iii) Call a grammar generation module to build a grammar for Sj. The inputs of the grammar generation module are the grammar of Si and the slot names of E.
4. For each newly created state Si and its Grammar Gi, repeat steps 3 to 4 until there are no new states.

Referring to FIG. 6, numeral 602 represents the parameters of a predefined grammar analysed by a grammar parser module. The square boxes e.g. 604, 606 list the semantic slot combinations that can be filled. The circles e.g. 608, 610 represent states in which unfulfilled slots are listed. The generation of the states can be performed dynamically. For example, if a user fulfils the slot combinations shown at numeral 606 ie. "action", "from_city", "to_city" and "date" have been fulfilled, a new state 610 (and corresponding generation of a new grammar to fill this new state) is formed for the remaining unfulfilled slot "airline". State transitions e.g. 612, 614 show the transition to new states upon receipt of semantic slot combination orders from a user voice input. It will be appreciated that the state shown at numeral 616 has not been expanded in this figure illustration and the expansion can be complicated with the different slot combinations that can be generated.

Figure 7:
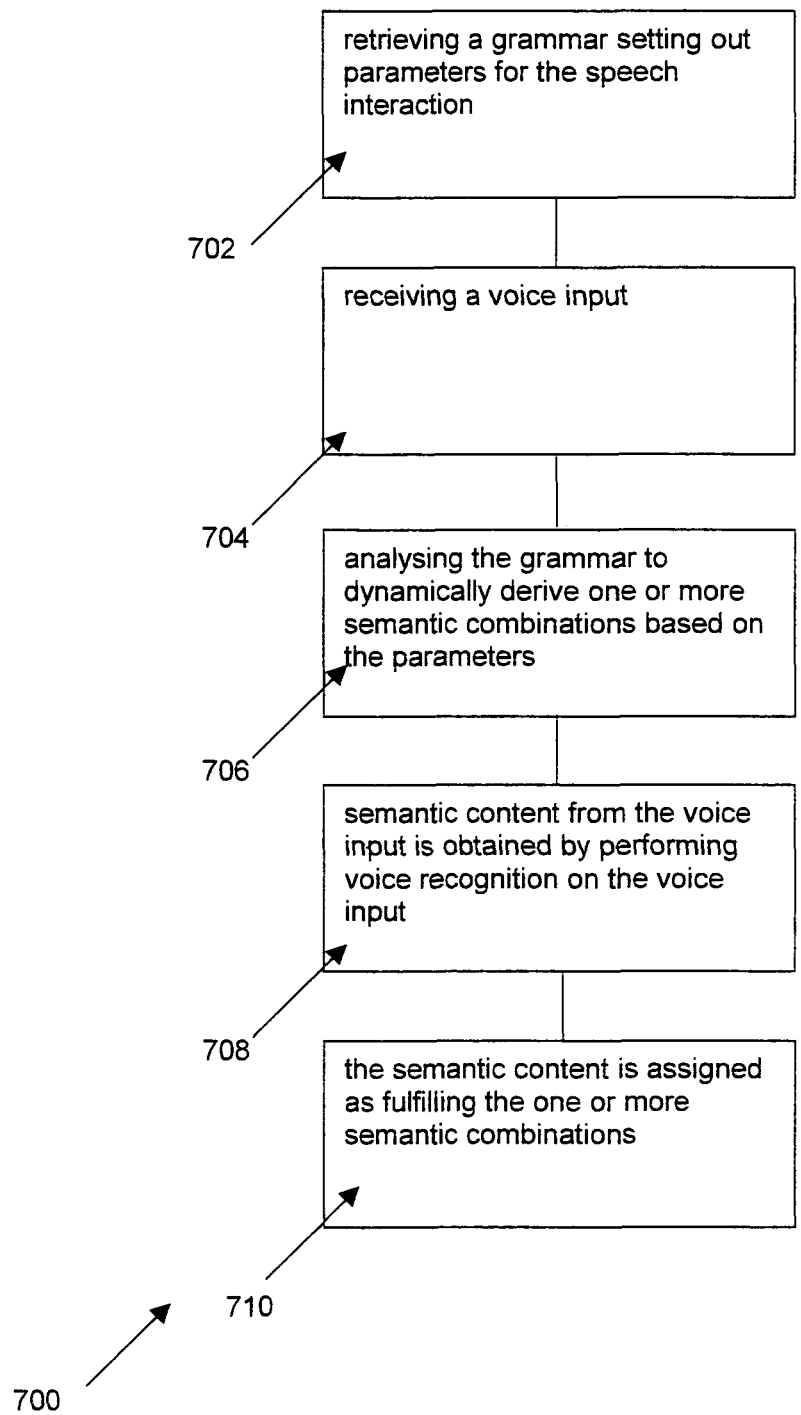
FIG. 7 is a schematic flow chart for illustrating a method for executing a fully mixed initiative dialogue (FMID) interaction between a human and a machine in an example embodiment.

FIG. 7 is a schematic flow chart 700 for illustrating a method for executing a fully mixed initiative dialogue (FMID) interaction between a human and a machine in an example embodiment. At step 702, a predefined grammar setting out parameters for the speech interaction is retrieved. At step 704, a voice input is received. At step 706, the grammar is analysed to dynamically derive one or more semantic combinations based on the parameters. At step 708, semantic content from the voice input is obtained by performing voice recognition on the voice input. At step 710, the semantic content is assigned as fulfilling the one or more semantic combinations.

The above described example embodiments can provide an engineering architecture that can be applied for speech recognition application development packages. The above described example embodiments can provide technologies for creating complicated spoken language dialogue systems. The above described example embodiments can make use of current industry standards including Voice Extensible Markup Language (VoiceXML), Speech Synthesis Markup Language (SSML) and Semantic Interpretation for Speech Recognition (SISR). The above described example embodiments can also significantly reduce efforts for developing complicated systems, e.g. by using automatic sub grammar generation and/or by using automatic sub dialogue generation. Furthermore, the example embodiments can make maintenance work easier, e.g. by providing an automatic response to data changes (such as changes in a predefined top level grammar before entering into a grammar parser module) and e.g. by providing an automatic change of dialogue flows. In addition, the above described example embodiments can provide web based dialogue development and testing platforms which can allow a designer to rapidly create speech dialogue applications from the web.

Further, the above described example embodiments can provide a dialogue design tool implemented based on the technologies of Java Server Page (JSP), Voice XML and Web Server. The above described example embodiments can be used to design a complicated FMID system that may not be easily achieved by human experts. The above described example embodiments can give rise to higher productivity. Further, experimental results show that up to about 50% of time can be saved using the above described example embodiments as compared to computer aided dialogue design modules.

Figure 8:
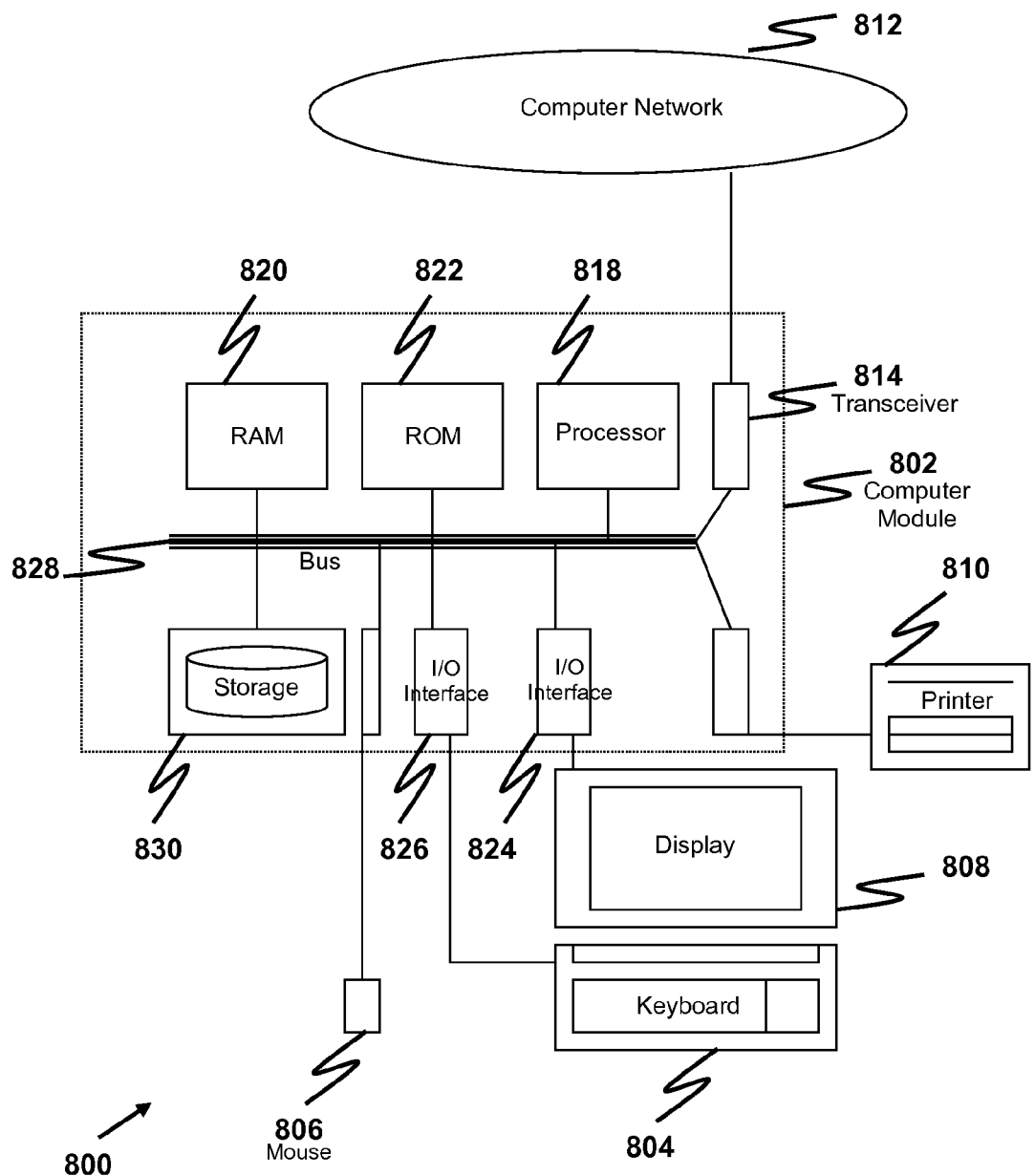
FIG. 8 is a schematic diagram of a computer system for implementing an example embodiment.

The method and system of the example embodiment can be implemented on a computer system 800, schematically shown in FIG. 8. It may be implemented as software, such as a computer program being executed within the computer system 800, and instructing the computer system 800 to conduct the method of the example embodiment.

The computer system 800 comprises a computer module 802, input modules such as a keyboard 804 and mouse 806 and a plurality of output devices such as a display 808, and printer 810.

The computer module 802 is connected to a computer network 812 via a suitable transceiver device 814, to enable access to e.g. the Internet or other network systems such as Local Area Network (LAN) or Wide Area Network (WAN).

The computer module 802 in the example includes a processor 818, a Random Access Memory (RAM) 820 and a Read Only Memory (ROM) 822. The computer module 802 also includes a number of Input/Output (I/O) interfaces, for example I/O interface 824 to the display 808, and I/O interface 826 to the keyboard 804.

The components of the computer module 802 typically communicate via an interconnected bus 828 and in a manner known to the person skilled in the relevant art.

The application program is typically supplied to the user of the computer system 800 encoded on a data storage medium such as a CD-ROM or flash memory carrier and read utilising a corresponding data storage medium drive of a data storage device 830. The application program is read and controlled in its execution by the processor 818. Intermediate storage of program data maybe accomplished using RAM 820.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for executing a fully mixed initiative dialogue (FMID) interaction between a human and a machine, the method comprising retrieving a predefined grammar setting out parameters for the interaction;
receiving a voice input;
analysing the grammar to dynamically derive one or more semantic combinations based on the parameters;
obtaining semantic content by performing voice recognition on the voice input; and
assigning the semantic content as fulfilling the one or more semantic combinations.

2. The method as claimed in claim 1, further comprising deciding on whether there are any unfulfilled semantic combinations; and
if there are any unfulfilled semantic combinations,
dynamically generating a new grammar based on the unfulfilled semantic combinations and the originally retrieved grammar, and
applying said new grammar for a new speech interaction.

3. The method as claimed in claim 2, wherein said dynamically generating comprises removing grammar items from the originally retrieved grammar based on fulfilled semantic combinations, instantiating grammar items from the originally retrieved grammar based on fulfilled semantic combinations or both.

4. The method as claimed in claim 2, further comprising generating a dialogue for the new speech interaction using the new grammar.

5. The method as claimed in claim 1, further comprising constructing a Finite State Machine (FSM) architecture based on the semantic combinations for generating one or more new states if there are any unfulfilled semantic combinations and for showing state transitions once semantic combinations are fulfilled.

6. The method as claimed in claim 1, further comprising forming a slot filling table using the derived one or more semantic combinations.

7. The method as claimed in claim 1, wherein said analysing the grammar comprises converting the grammar into a logical expression.

8. The method as claimed in claim 7, wherein the converting the grammar into a logical expression is based on an algorithm comprising the steps of:
for the grammar G comprising items G1, G2, . . . , Gn,
setting a slot filling logical expression L empty;
if Gi(s) are in Concatenation And relations, let $L=(G1\hat{}G2\hat{} \ldots \hat{}Gn)$;
if Gi(s) are in Selective Or relations, let $L=(G1+G2+\ldots+Gn)$;
if Gi is an optional item, then replace Gi in L with (I+Gi), where I is an empty variable;
if Gi assigns a slot name s, replace Gi in L with (s$\hat{}$Gi);
if Gi is a sub-grammar, recursively call this algorithm;
if Gi is a terminal, replace Gi in L with I;
forming L by applying the rules $x\hat{}(y+z)=x\hat{}y+x\hat{}z$, $x+x=x$, $x\hat{}x=x$, $x\hat{}I=x$, $x+y=y+x$, $x\hat{}y=y\hat{}x$.

9. The method as claimed in claim 1, wherein the one or more semantic combinations are usable for carrying out a task.

10. A dialogue system for a fully mixed initiative dialogue (FMID) interaction between a human and a machine, the system comprising
a grammar parser module for retrieving a grammar setting out parameters for the interaction, the grammar parser module analysing the grammar to dynamically derive one or more semantic slot combinations based on the parameters;
a browser module for receiving a voice input;
a recognition server for obtaining semantic content by performing voice recognition on the voice input; and
wherein the grammar parser module assigns the semantic content as fulfilling the one or more semantic combinations.

11. The system as claimed in claim 10, further comprising the grammar parser module for deciding whether there are any unfulfilled semantic slot combinations; and
a grammar generation module;
wherein if there are any unfulfilled semantic combinations, the grammar generation module dynamically generates a new grammar based on the unfulfilled semantic combinations and the originally retrieved grammar and applies said new grammar for a new speech interaction.

12. The system as claimed in claim 11, wherein said dynamically generating comprises the grammar generation module removing grammar items from the originally retrieved grammar based on fulfilled semantic combinations, the grammar generation module instantiating grammar items from the originally retrieved grammar based on fulfilled semantic combinations or both.

13. The system as claimed in claim 11, further comprising a dialogue generation module for generating a dialogue for the new speech interaction using the new grammar.

14. The system as claimed in claim 10, further comprising a Finite State Machine (FSM) constructor for constructing a FSM architecture based on the semantic combinations for generating one or more new states if there are any unfulfilled semantic combinations and for showing state transitions once semantic combinations are fulfilled.

15. The system as claimed in claim 10, further comprising the grammar parser module forming a slot filling table using the derived one or more semantic combinations.

16. The system as claimed in claim 10, wherein said analysing the grammar comprises the grammar parser module converting the grammar into a logical expression.

17. The system as claimed in claim 16, wherein the grammar parser module converts the grammar into a logical expression based on an algorithm comprising the steps of:

for the grammar G comprising items G1, G2, . . . , Gn, setting a slot filling logical expression L empty;

if Gi(s) are in Concatenation And relations, let L= (G1^G2^ . . . ^Gn);

if Gi(s) are in Selective Or relations, let L=(G1+ G2+ . . . +Gn);

if Gi is an optional item, then replace Gi in L with (I+Gi), where I is an empty variable;

if Gi assigns a slot name s, replace Gi in L with (s^Gi);

if Gi is a sub-grammar, recursively call this algorithm;

if Gi is a terminal, replace Gi in L with I;

forming L by applying the rules x^(y+z)=x^y+x^z, x+x=x, x^x=x, x^I=x, x+y=y+x, x^y=y^x.

18. The system as claimed in claim 10, wherein the one or more semantic combinations are usable for carrying out a task.

19. A non-transitory computer readable data storage medium having stored thereon computer code means for instructing a computer processor to execute a method for executing a fully mixed initiative dialogue (FMID) interaction between a human and a machine, the method comprising retrieving a predefined grammar setting out parameters for the interaction; receiving a voice input;

analysing the grammar to dynamically derive one or more semantic combinations based on the parameters;

obtaining semantic content by performing voice recognition on the voice input; and assigning the semantic content as fulfilling the one or more semantic combinations.

\* \* \* \* \*